United States Patent [19]

Doremus

[11] Patent Number: 4,651,828

[45] Date of Patent: Mar. 24, 1987

[54] SAFETY VALVE IN PARTICULAR FOR CLOSING AN OIL WELL

[75] Inventor: Bernard Doremus, Echouboulains, France

[73] Assignee: Schlumberger Technology Corporation, Houston, Tex.

[21] Appl. No.: 842,053

[22] Filed: Mar. 17, 1986

Related U.S. Application Data

[63] Continuation of Ser. No. 686,952, Dec. 27, 1984, abandoned.

[30] Foreign Application Priority Data

Dec. 28, 1983 [FR] France ................... 83 20955

[51] Int. Cl.[4] ........................................... E21B 34/10
[52] U.S. Cl. ...................... 166/319; 166/332; 251/58; 251/315; 251/352
[58] Field of Search ............... 166/319, 321, 330, 332, 166/334, 374, 375; 251/58, 63.5, 315, 352

[56] References Cited

U.S. PATENT DOCUMENTS

| Re. 25,471 | 11/1963 | Fredd | 166/72 |
|---|---|---|---|
| 2,998,077 | 8/1961 | Keithahn | 166/334 |
| 3,509,913 | 5/1970 | Lewis | 166/321 |
| 4,009,735 | 3/1977 | McGill et al. | 251/58 |
| 4,086,935 | 5/1978 | Raulins et al. | 166/321 X |
| 4,252,197 | 2/1981 | Pringle | 166/322 |
| 4,446,922 | 5/1984 | Bowyer et al. | 166/322 |
| 4,461,353 | 7/1984 | Vinzant et al. | 166/332 |
| 4,467,870 | 8/1984 | Langham | 166/321 |
| 4,522,370 | 6/1985 | Noaek et al. | 251/63.5 |
| 4,569,397 | 2/1986 | Brakhage, Jr. et al. | 166/321 |

Primary Examiner—James A. Leppink
Assistant Examiner—Hoang E. Dang

[57] ABSTRACT

A ball element pivotally mounted on a sleeve that slides within the tubular valve member of a well safety valve has a radial slot extending across its width parallel to and offset from its pivotal axis. A bar extending in secant fashion across the valve member engages the slot, rotating the ball element to open and close the valve as the sleeve slides back and forth. An unslotted outer surface portion of the ball element mates with the valve seat during valve closing.

11 Claims, 7 Drawing Figures

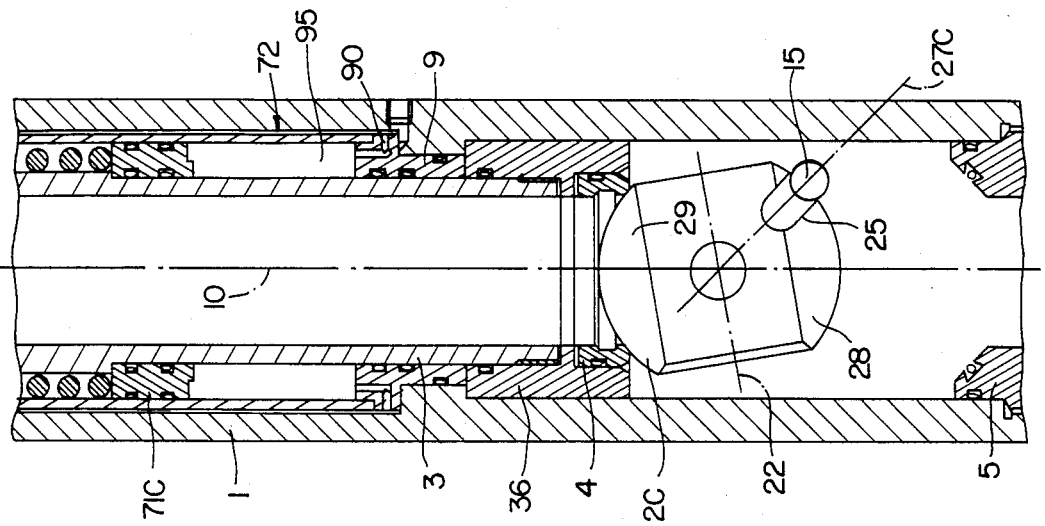
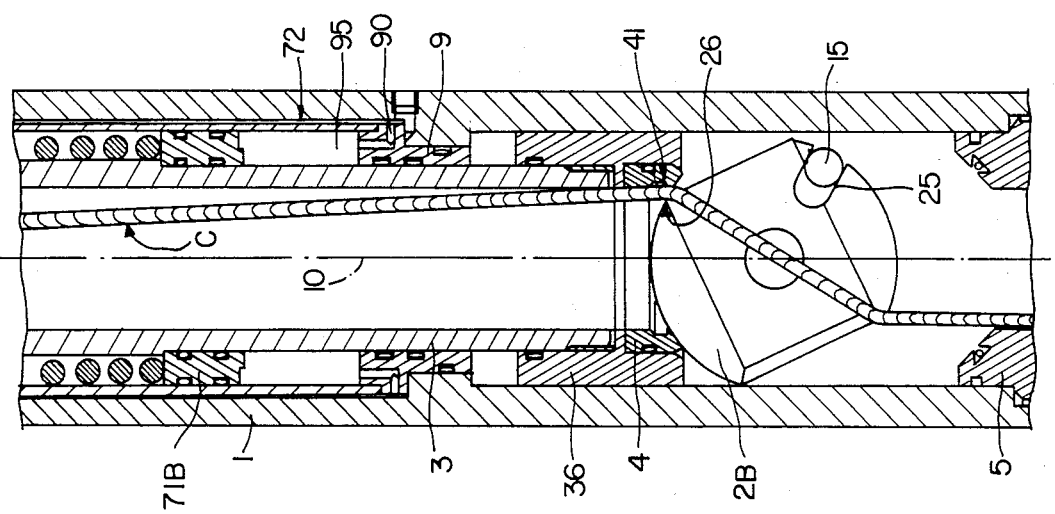
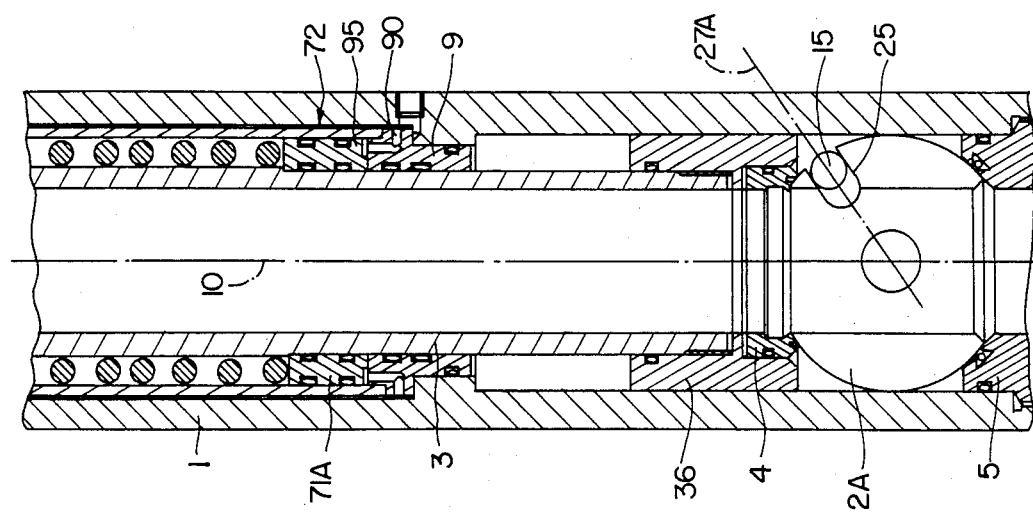

SAFETY VALVE IN PARTICULAR FOR CLOSING AN OIL WELL

This application is a continuation, now abandoned of application Ser. No. 686,952, filed Dec. 27, 1984.

BACKGROUND OF THE INVENTION

1. Technical Field

The invention relates to a safety valve capable of operating under high pressure and in the presence of a high flow rate. It applies particularly, but not exclusively, to valves which are placed notably at the head of hydrocarbon wells in order to close them for safety reasons.

2. Background Information

The use of spherical plug or ball valves as safety valves at well heads is well known. In their general structure, these valves include a valve body of generally cylindrical shape, a spherical plug or ball element mounted in this body for pivotal movement about an axis perpendicular to its bore, control means comprising a sliding sleeve capable of moving the ball between an open position and a closed position, and two seats with openings capable of defining a passage in the valve body with the bore of the ball when the latter is in the open position.

However, prior art valves exhibit various drawbacks. First of all, they make use in most cases of two stirrups around the ball element, one of which is designed to support it swivelably, and the other to actuate it between the open and closed positions. This arrangement leads to a large valve outer diameter.

Furthermore, with a two-stirrup mechanism of the type described above, the lever arm available for actuating the spherical plug is quite small.

The extent of this drawback will be better appreciated if it is noted that a safety valve for a well should be capable of operating under a pressure of 700 bars or more with a high flow rate corresponding to an internal passage of 7.62 centimeters (3 inches). With a small lever arm for the actuation of such a valve, it is necessary to provide a significant hydraulic pressure to actuate it.

Another problem encountered for safety valves is that during their actuation, they must be capable of cutting off different types of cables and tubes introduced through the ball element.

SUMMARY OF THE INVENTION

It is the object of the present invention to solve these problems. For this purpose, the invention provides a safety valve of the above-mentioned type in which the sleeve placed inside the valve body supports the ball element for pivotal movement about its axis, one of the fluid-tight bearings being integral with this sleeve and remaining in contact with the ball element, while the other is integral with the valve body. A reverse-cam is provided between the valve body and the ball element for cooperation in a zone offset from the pivotal axis of the ball element. Through the action of this arrangement, sliding of the control sleeve along the valve body results in a combined movement of ball translation and rotation about this cam zone.

In a preferred embodiment of the invention, the valve body is provided, adjacent the ball element, with a fixed bar mounted parallel to offset from the pivot pin of the ball element. The ball element has a radial slot which extends parallel to its pivotal axis across its entire width, the bar and the slot remaining in reverse-cam cooperation during the movement of the ball between its open position and its closed position.

It is thus possible to obtain a large lever arm, especially when the bar is positioned so that it is on the limit of contact with the slot of the ball element when the latter is in its closed position.

According to another aspect of the invention, the ball element is inclined in its closed position so that one of the points of the seat which remains in contact with the ball is in the immediate vicinity of an edge of the bore of the ball when the valve is closed. This makes it possible to limit the travel necessary for the rotation of the ball and consequently minimize the length of the valve.

Finally, according to another aspect of the invention, the ball element and the seat integral with the sleeve are designed to cooperate in the manner of a shearing device during the closing of the valve.

BRIEF DESCRIPTION OF THE DRAWINGS

Other characteristics and advantages of the invention will appear from the following detailed description given in connection with the appended drawings in which:

FIGS. 2A to 2C are partial sections, slightly enlarged in relation to FIG. 1, and illustrating three positions of the ball element;

DESCRIPTION OF PREFERRED EMBODIMENT

The embodiment described and represented concerns a normally closed valve. However, the principles of the present invention are equally applicable to a normally open valve.

Figure 1:
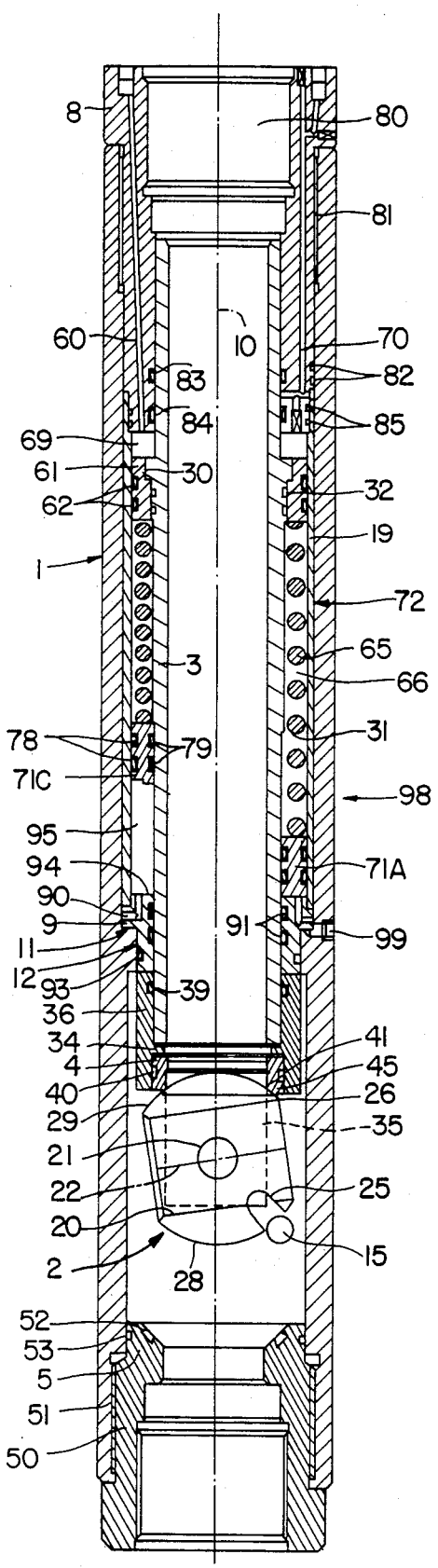
FIG. 1 is a general view in vertical longitudinal section of a valve according to the present invention.
Figure 3:
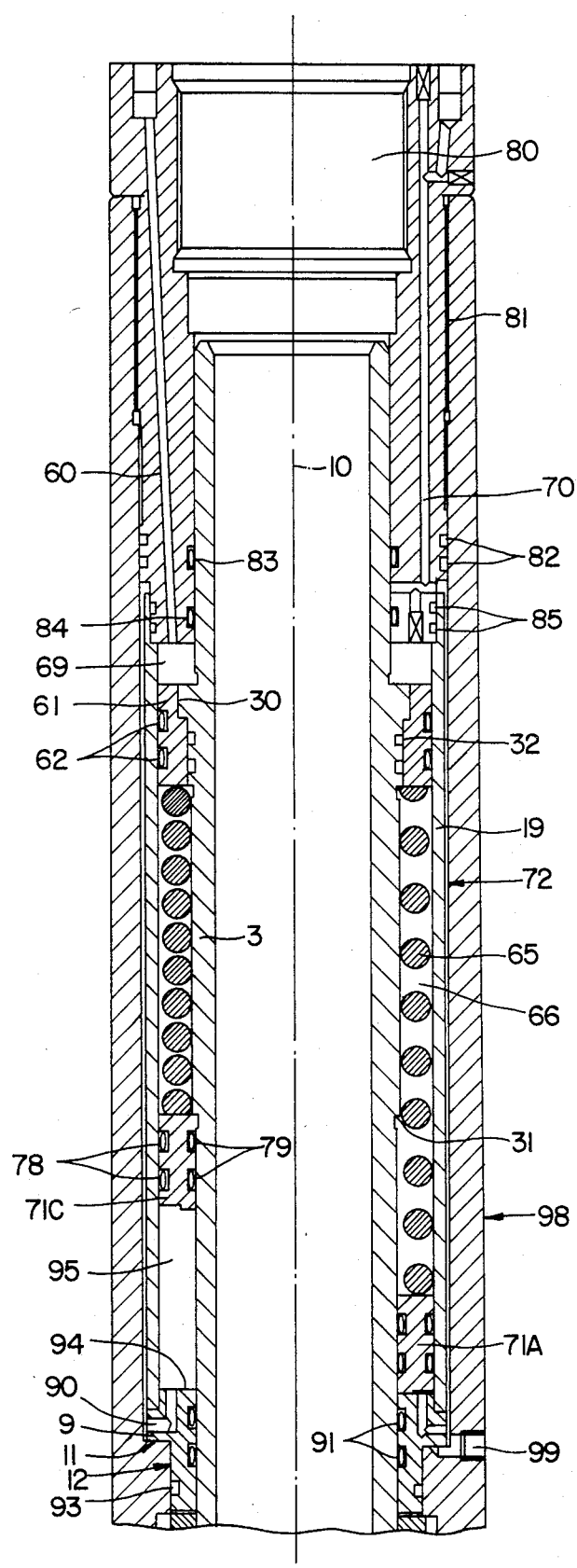
FIG. 3 is a sectional view, also enlarged in relation to FIG. 1, showing in greater detail the valve actuation means.

Reference will now be made to FIGS. 1 to 3. The valve comprises a valve body 1 of generally cylindrical form. On top, the valve body receives an end piece 8 which engages on the valve body 1 by means of a thread 81. In this end piece 8 is provided a bored axial passage 80. In its lower part, this passage 80 guides a control sleeve 3 which is also of generally cylindrical form. Seals 83 and 84 provide sealing between the end piece 8 and the sleeve 3. Externally, the lower part of the end piece 8 is also provided with seals 82 providing sealing with respect to the internal wall of the valve body 1. Finally, the end piece is traversed axially by two conduits 60 and 70 used respectively for controlling the opening and the closing of the valve.

Further below, the valve body defines internally a shoulder 11. This shoulder receives, as a stop, a bushing 9 internally recessed to receive a seal 91 at the lower end of the sleeve 3. Under the shoulder 11, the body defines a bored annular projection 12 which guides the bushing 9 with the insertion of a seal 93. This guiding is designed such that, over the shoulder 11, there is a peripheral clearance around the bushing 9, between it and the body 1. A channel 90 starts at the thin annular space defined by this clearance and leads to the upper side 94 of the bushing 9. Furthermore, the bushing 9 is kept in place by a fixed sleeve 19 which bears at its lower end on the bushing 9. On top, the sleeve 19 terminates in a thinned part fitting with a seal 85 on the bottom of the end piece 8. Here too, clearance is provided between the external wall of the fixed sleeve 19 and the valve body 1. This clearance defines an annular channel communicating upward with the closing control conduit 70 and downward with the tubular channel 90. The seals 82 to 85 as well as 93 ensure the absence of leaks in this annular communication passage.

The control sleeve 3 has a threaded annular shoulder 30, turned outward, on which is fixed a first annular piston 61. Sealing 32 is provided between this first piston and the sleeve 3. The piston 61 slides inside the fixed sleeve 19 of the valve body 1 with a seal 62 inserted therebetween. The valve opening control conduit 60 leads into the annular chamber 69 defined over the first piston 61.

Below this first piston 61, an annular cavity 66 is defined between the fixed sleeve 19 and the control sleeve 3. This cavity is delimited at its lower end by a second annular piston 71 provided on each side with seals 78 and 79. A spring 65 extends between pistons 61 and 71 within the cavity 66. In FIG. 1, the piston 71 is shown in two different positions 71A and 71C, as further described below. The movement of this second piston 71 upward in relation to the control sleeve 3 is limited by a shoulder 31 formed on the sleeve.

In its position 71C, the second piston is up against this shoulder 31. A second annular chamber 95 is then defined under the piston 71 and this chamber communicates with the channel 90 already mentioned.

On the bottom of the control sleeve 3 is screwed an annular end piece 36, with a seal 39 inserted therebetween. The sleeve 3 abuts an internal radial shoulder 34 in the valve closed position. An annular seat 4, is mounted below shoulder 34 coaxially with the sleeve 3 and pierced with a bore corresponding to that of the sleeve. A seal 40 is provided between the external periphery of the seat 4 and the end piece 36.

Figure 4A:
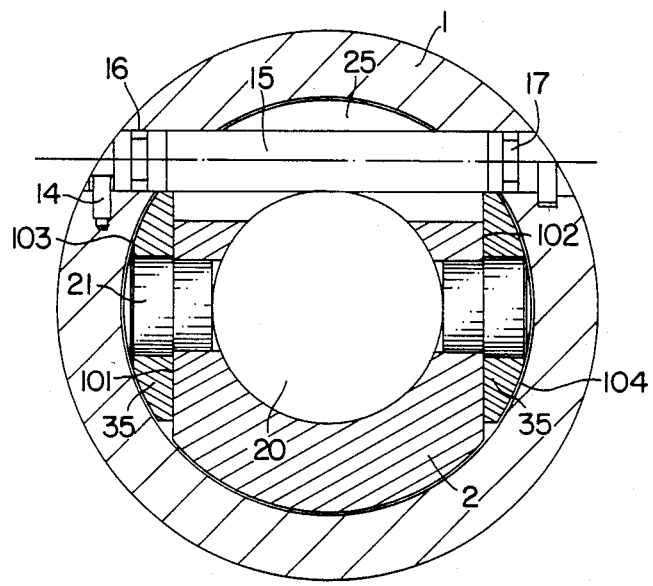
FIGS. 4A and 4B are respectively a sectional view along the line 27A of FIG. 2A and a corresponding partial side view making it possible to better understand the arrangement of the ball element in the valve body.

End piece 36 also has two downward extensions forming a stirrup 35. FIG. 4A shows how this stirrup 35 is provided with fingers or pins 21 which enable it to rotatably support a ball element 2 about a pivotal axis. The ball element 2 is configured with a bore 20 having an axis 22. The ball element has two external flat surfaces 101 and 102 perpendicular to the pivotal axis 21 of the ball that cooperates with corresponding internal flat surfaces of the two stirrups 35. The stirrups each additionally have, an outer surface 103 or 104 corresponding to part of a cylinder with a diameter equal to the outer diameter of the ball element 2. The latter diameter is advantageously practically equal to, but slightly smaller than, the internal diameter of the valve body 1. In the closed position, the top crown 29 of the ball is kept slightly prestressed on the corresponding seal 45 of the seat 4. On the left in FIG. 1, the end edge of the bore 20 is normally chamfered. On the right, the edge of the bore is fully chamfered so as to form a cutting edge. Correspondingly in its part in contact with the ball element the seat 4 has a pointed projection 41 (see FIG. 2B) which can form a shear with the cutting edge of the ball element 2. A milled slot 25 is provided radially in the lower crown 28 of the ball element 2. This slot extends over the entire width of the ball element parallel to its pivot pins 21. A fixed bar 15 mounted parallel to and offset from pivot pins 21 is received in slot 25 to extend through the ball element 2.

Finally, a lower end piece 50 is threaded at 51 to the lower end of the valve body 1. The end piece 50 defines the second seat 5 of the valve. End piece 50 is preferably provided with seals at 52 for engagement with the ball element and at 53 for engagement with the periphery of the valve body.

Advantageously, the cavity 66 of the spring 65 is filled with nitrogen under pressure. This filling takes place through a lateral orifice 99 located adjacent the shoulder 11. During the assembly of the valve body, the last operation is the placing of the fixed sleeve 19 and the upper end piece 8. The end of the sleeve 19 is only partially fitted, stopping for example at the level of the arrow 98. The cavity 66 is then pressurized by nitrogen introduced through the plug 99. This nitrogen goes into the annular space provided around the bushing 9 and rises through it up to the recess 66 since the sleeve 19 does not close it off yet. The sleeve 19 is then fitted in place by means of the upper end piece 8. The nitrogen supply can then be disconnected from the orifice 99. The nitrogen injected into the chamber 66 is trapped by the seals 78, 79, 62 and 32.

FIG. 2A illustrates the safety valve in the open position. Here, the ball element 2A is in contact with the two seats 4 and 5. As the slot 25 leads into the bore 20 of the ball, the space around the ball element is also filled with fluid. This fluid is however stopped by the seals provided at 39, 93 and 53 (see FIG. 1). In this position, the second annular piston is in its lower position 71A, and the first annular piston 61 (not shown in FIG. 2A) has advanced the control sleeve 3 downward by the application of fluid pressure in the chamber 69 through the conduit 60.

When pressure is no longer applied in the conduit 60, but is transmitted on the other hand to the closing conduit 70, the piston 71B, which is up against the shoulder 31 of the control sleeve 3, causes the sleeve to move upward, as shown in FIG. 2B. The stirrups 35 (FIGS. 1 and 4A) linked with the sleeve 3 by the end piece 36 then drives up the pivot pins 21 of the ball element 2. A ball translation/rotation movement is thus imparted to the ball, which causes it to swivel around the bar 15. FIG. 2B shows that the upper crown 29 (FIG. 1) of the ball 2 slides on the left-hand part of the upper seat 4. When the closing position is almost reached, the edges 26 and 41 can cut through tubing or cable C used to lower various equipment into the well. The cable or tubing could be a small single-strand or multi-strand electric cable or even thin tubing (as, for example, 2.5 cm outer diameter tubing with a thickness of 3 mm).

After these possible cutoff operations, the ball element reaches its closing position 2C shown in FIG. 2C. In this position, the ball element is slightly inclined. It is also seen that the control fluid applied to the lower annular chamber 95 has completely raised the second annular piston at 71C.

As can be seen with reference to FIG. 1, the bore fluid pressure to be controlled by the valve facilitates valve closing. The outer diameter of the sleeve 3 adjacent the chamber 69 is slightly smaller (by about 2 mm) than that of the sleeve 3 adjacent the seal 39. The fluid pressure to be controlled thus tends to cause the upward movement of the sleeve 3.

An examination of FIGS. 2A to 2C shows various other characteristics of the invention:

In the closed position of the ball element, the bar 15 is on the outer extent of contact with the slot 25 of the ball element.

FIG. 2C shows that, in the closed position, one of the points of the seat 4 is in the immediate vicinity of an edge 26 of the bore 20 of the ball element.

In the same position, the axis 22 of the bore 20 of the ball forms an angle of about 10 degrees with the cross section of the valve body (9 degrees in FIG. 2C) where the angle between the axis of the ball bore and the radial plane going through the axis of the bar 15 is, for its part, 55 degrees.

The outer diameter of the ball element 2 is substantially equal to the inner diameter of the cylindrical valve body 1, no mobile part being placed between the two.

In the open position of the valve (FIG. 2A), the bar 15 comes very near the seat 4 which is connected with the sleeve 3.

It will also be noted, as seen in FIG. 2C, that it is the top crown 29 of the ball element which supports the stresses related to the fluid pressure existing during closing. On the other hand, the lower crown 28 which carries the slot 25, is practically free from these stresses.

Figure 4B:
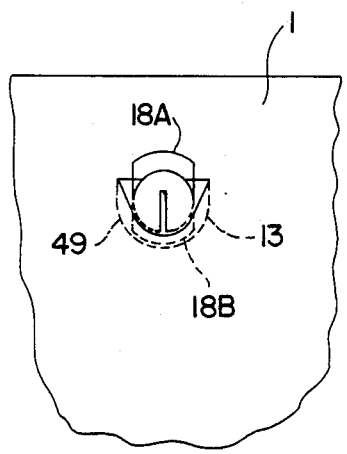

Another important feature of the invention is the solidity of the bar 15 and its attachment in the valve body. This attachment is illustrated in FIGS. 4A and 4B. The valve body 1 has two cylindrical bores capable of receiving the ends of the bar 15. On the left, a pin 14 is screwed in the valve body to form a rotation stop for the bar 15, which includes an O-ring seal 16. Considering the position of the pin 14, the left end of the bar 15 is machined to conform to the external profile of the valve body 1. On the right, the end of the bar 15 has a second O-ring seal 17. Further to the right, the bar is provided with a tab 18 forming a projecting shoulder. The external profile of this tab is in the form of an arc, the length of this arc being of the order of 90 degrees. When the bar 15 is inserted, the tab 18 is in the position 18A (FIG. 4B). It is then made to turn by 180 degrees to bring it to the position 18B where it engages in the corresponding annular slot 49 of the valve body 1. Finally, in the final position of the bar 15, its right-hand edge mates continuously with the cylindrical outer profile of the valve body 1. The bar 15 is stopped rotation-wise by the pin 14.

The valve according to the present invention offers in particular the following advantages:

Valve body of unitary construction whose cylindrical internal bore is used to the maximum and is totally filled by the ball element.

Obtaining a large lever arm for the control of the ball element by the interaction of the bar 15 and the slot 25.

Valve closing function performed by the spherical crown 29, which is not machined, whereas it is the other spherical crown 28 which receives the slot 25.

Excellent mechanical properties, especially for operation under high pressure and high flow rates, while conserving small overall dimensions.

What is claimed is:

1. A full-bore safety valve comprising:
   a tubular body adapted for connection in a well bore pipe string and having a longitudinal passage along its central axis;
   a tubular member having a full-bore axial passage cooperatively arranged within said body for movement therein between spaced upper and lower positions in said longitudinal passage;
   pressure-responsive means cooperatively arranged for selectively moving said tubular member between its said spaced positions;
   valve means including an annular valve seat on one end of said tubular member, a valve member having a spherically-curved exterior surface complementally fitted on said valve seat and adapted to remain seated thereon upon rotation of said valve member relative thereto, means supporting said valve member on said tubular member for rotation relative to said valve seat about a pivotal axis perpendicular to said central axis, and means defining a full-bore passage through said valve member with an entrance opening in its curved exterior surface and an exit opening on the opposite side of said valve member; and valve-actuating means operable in response to movement of said tubular member between its said spaced positions for rotating said valve member about its said pivotal axis including a rigid member secured to said body and extended transversely across said longitudinal passage parallel to said pivotal axis and laterally spaced therefrom, and means on said valve member defining upper and lower opposed surfaces paralleling one another and said pivotal axis and respectively extending transversely across said valve member adjacent to one edge of said entrance opening above and below said rigid member so that upon movement of said tubular member toward one of its said spaced positions, one of said opposed surfaces will engage said rigid member for rotating said valve member to a passage-opening position in which said opening of said full-bore passage is coaxially aligned with said valve seat and upon movement of said tubular member toward the other of its said spaced positions, the other of said opposed surfaces will engage said rigid member for rotating said valve member to a passage-closing position in which said entrance opening of said full-bore passage is angularly spaced from said valve seat.

2. The full-bore safety valve of claim 1 wherein said one spaced position of said tubular member is its lower position and said other spaced position of said tubular member is its upper position.

3. The full-bore safety valve of claim 1 wherein said opposed surfaces are defined by the side walls of an outwardly-facing slot extending transversely along a chord of said curved exterior surface of said valve member.

4. The full-bore safety valve of claim 1 further including means on said annular valve seat defining an inwardly-projecting cutting edge cooperatively arranged to cooperate with the edge of said entrance opening of said valve member that is diametrically opposite from said one edge thereof operable for severing an elongate member extending through said safety valve upon rotation of said valve member toward its said passage-closing position.

5. The full-bore safety valve of claim 4 wherein said opposed surfaces are defined by the side walls of an outwardly-facing slot extending transversely along a chord of said curved exterior surface of said valve member.

6. The full-bore safety valve of claim 1 wherein said pressure-responsive means are selectively operable for moving said tubular member to its said one spaced position in response to a first pressure and for moving said tubular member to its said other spaced position in response to a second pressure.

7. The full-bore safety valve of claim 1 wherein said annular valve seat lies in a transverse plane that is perpendicular to said central axis of said body.

8. The full-bore safety valve of claim 7 further including means on said annular valve seat defining an inwardly-projecting cutting edge cooperatively arranged to cooperate with the edge of said entrance opening in said valve member that is diametrically opposite from said one edge thereof for severing an elongate member extending through said safety valve upon rotation of said valve member toward its said passage-closing position.

9. The full-bore safety valve of claim 8 wherein said one spaced position of said tubular member is its lower position and said other spaced position of said tubular member is its upper position.

10. The full-bore safety valve of claim 9 wherein said curved exterior surface of said valve member includes an additional portion on said opposite side of said valve member encompassing said exit opening; and said full-bore safety valve also includes another annular valve seat coaxially mounted in said longitudinal passage below said valve member lying in a transverse plane that is perpendicular to said central axis and which is complementally shaped for receiving said additional portion of said curved exterior surface as said tubular member moves to its said lower position and said valve member is rotated to its said passage-opening position.

11. The full-bore safety valve of claim 10 wherein said opposed surfaces are defined by the side walls of an outwardly-facing slot extending transversely along a chord of said curved exterior surface of said valve member.

\* \* \* \* \*